United States Patent [19]

Arai

[11] Patent Number: 5,515,400
[45] Date of Patent: May 7, 1996

[54] METHOD FOR ARRANGING SIGNAL POINTS IN A QUADRATURE AMPLITUDE MODULATION/DEMODULATION SYSTEM

[75] Inventor: Yasuhiro Arai, Kawasaki, Japan

[73] Assignee: Fujitsu Limited, Kanagawa, Japan

[21] Appl. No.: 80,510

[22] Filed: Dec. 2, 1992

Related U.S. Application Data

[63] Continuation of Ser. No. 703,712, May 21, 1991, abandoned, which is a continuation of Ser. No. 480,387, Feb. 15, 1990, abandoned.

[30] Foreign Application Priority Data

Feb. 17, 1989 [JP] Japan .................................. 1-38752

[51] Int. Cl.$^6$ .................................................. H04L 5/12
[52] U.S. Cl. .................... 375/261; 375/281; 375/298; 375/329; 375/340; 371/56; 332/103; 332/145; 329/304
[58] Field of Search .............................. 375/37, 38, 39, 375/41, 53, 54, 83, 85, 94, 259, 260, 261, 268, 280, 281, 298, 329–332, 340; 371/34, 43, 56; 329/304; 332/103, 145

[56] References Cited

U.S. PATENT DOCUMENTS

| | | | |
|---|---|---|---|
| Re. 33,041 | 8/1989 | Calerbank et al. ........................ | 375/39 |
| Re. 33,056 | 9/1989 | Forney, Jr. et al. ........................ | 375/39 |
| 3,887,768 | 6/1975 | Forney, Jr. et al. ........................ | 375/39 |
| 4,029,903 | 6/1977 | Tamburelli .................................. | 375/39 |
| 4,247,944 | 1/1981 | Sifford ........................................ | 375/94 |
| 4,271,527 | 6/1981 | Armstrong .................................. | 375/39 |
| 4,327,439 | 4/1982 | Gockler et al. ............................ | 375/54 |
| 4,439,863 | 3/1984 | Bellamy ..................................... | 375/39 |
| 4,455,663 | 6/1984 | Ragsdale ..................................... | 375/39 |
| 4,520,490 | 5/1985 | Wei ............................................. | 375/27 |
| 4,534,040 | 8/1985 | Thapar ........................................ | 375/59 |
| 4,538,284 | 8/1985 | Lang et al. .................................. | 375/39 |
| 4,571,550 | 2/1986 | Head ............................................ | 375/39 |
| 4,597,090 | 6/1986 | Forney, Jr. .................................. | 375/67 |
| 4,613,976 | 9/1986 | Sewerinson et al. ....................... | 332/103 |
| 4,660,214 | 4/1987 | Pahlavan et al. ........................... | 371/43 |
| 4,687,999 | 8/1987 | Desperben et al. ........................ | 329/304 |
| 4,860,316 | 8/1989 | Takenaka et al. .......................... | 371/43 |
| 5,107,504 | 4/1992 | Nakamura et al. ......................... | 371/37.1 |
| 5,214,656 | 5/1993 | Chung et al, .............................. | 375/39 |

*Primary Examiner*—Stephen Chin
*Assistant Examiner*—Amanda T. Le
*Attorney, Agent, or Firm*—Nikaido, Marmelstein, Murray & Oram

[57] ABSTRACT

In a signal point arranging method for use with a quadrature amplitude modulator/demodulator device in which a desired number of signal points are arranged on a rectangular plane, a plurality of grid points are first set such that they are symmetrical with respect to the rectangular coordinate axes of the rectangular plane and arranged at intervals of a unit distance. Next, a plurality of concentric circles with their center at the coordinate origin of the rectangular plane are set, each of the concentric circles having a radius equal to a distance between the coordinate origin and a grid point. Then, a desired number of signal points are arranged on points of intersection of the grid points, the concentric circles beginning with the circle smallest in radius and continuing with circles of increasing radius. As a result, each of the signal points can be arranged as close to the coordinate origin as possible, thus enabling the peak power of modulated signals to be minimized. In addition, since the distance between signal points can be held constant, the S/N characteristic does not vary with the signal points and a constant transmission error rate can be secured. As a result, a signal point arrangement is obtained which enables data transmission at minimum required power, reduces transmission error rate and minimizes the S/N characteristic.

7 Claims, 5 Drawing Sheets

METHOD FOR ARRANGING SIGNAL POINTS IN A QUADRATURE AMPLITUDE MODULATION/DEMODULATION SYSTEM

This application is a continuation of application Ser. No. 703,712, filed on May 21, 1991, now abandoned, which is a continuation originally filed application Ser. No. 480,387 filed Feb. 15, 1990, now abandoned.

A method of arranging signal points in a quadrature amplitude modulation/demodulation system

BACKGROUND OF THE INVENTION

1. Field of the Invention

The present invention relates to a method of arranging signal points on a complex plane in a quadrature amplitude modulation/demodulation system and a quadrature amplitude modulator/demodulator device using this method.

2. Description of the Related Art

Recently, various types of high-speed modems which modulate and transmit digital signals at high speed have been manufactured as significant improvements have been made in the processing power of digital-signal processing LSIs. In order to implement high-quality data transmission using high-speed modems, it is essential to introduce a modulation/demodulation system which is capable of maximizing the signal-to-noise (S/N) ratio while minimizing transmission error rate.

To provide efficient communication, the quadrature amplitude modulation/demodulation system is adapted to transmit as much digital data as possible within a limited transmission bandwidth. In this system, a correspondence is established between M kinds of data patterns represented by $\log_2 M$ bits and M signal points on a complex plane. Two carrier components $\cos_\omega t$ and $\sin_{107} t$ ($_\omega$ is angular frequency of carriers and t is time), which are 90° apart in phase, are amplitude modulated with a real value and an imaginary value, respectively, indicating coordinate data of each signal point on the complex plane. The resulting amplitude modulated carriers are added to produce a combined modulated signal for transmission. On the other hand, the demodulation side multiplies the modulated signal by $\sin_\omega t$ and $\cos_\omega t$ to extract the real value and the imaginary values. A corresponding one of the M signal points is identified by these values so that M kinds of data patterns are demodulated.

In this case, parameters such as the S/N ratio and transmission error rate of a data transmission device, depend upon the way signal points are arranged on the complex plane. In general, to implement a signal point arrangement for achieving good transmission performance, two conditions should be satisfied.

First, the transmission error rate depends on the distance between signal points on the complex plane. That is, where a signal point is identified by a modulated signal in the demodulation system, if the distance between signal points is too small on the complex plane, a signal point adjacent to the true signal point may be extracted erroneously. To secure a low transmission error rate, therefore, the distance between each pair of signal points on the complex plane must be accurately determined. In particular, in order to secure a low, constant transmission error rate among signal points, the distance between adjoining signal points should be constant.

Second, in general, when a transmitter is supplied with high-power modulated signals, its output is liable to saturate, thus increasing transmission error. The power of modulated signals must therefore be made as low as possible so as to decrease transmission power. The peak power of modulated signals in particular must be made as low as possible. It is known that the power of a modulated signal based on a signal point on the complex plane is proportional to the square of the distance between the signal point and the origin of the complex plane. It is also known that the farther a signal point is from the origin, the higher is the power of a modulated signal corresponding to that signal point. In order to lower the power of modulated signals, therefore, it is required to arrange each signal point as close to the origin as possible.

A conventional method of arranging signal points in a quadrature amplitude modulator/demodulator device is described below, taking the above two conditions into consideration.

A first prior art signal point arranging method, is shown in FIG. 1A. Here, signal points are arranged in an 8×8 grid-like pattern on a phase plane with an outward form of a square. A second prior art, signal point arranging method is shown in FIG. 1B. Here, four corners of a square are cut away. According to both of these prior art methods, the distance between signal points can be made constant, thus meeting the first condition. There is also an integral-multiple relationship in each of the real and imaginary values in coordinate data between signal points, thus permitting such modulator/demodulator devices to be simply constructed. In both the first and second prior arts, however, no measures are taken to bring the signal points as close to the origin of the complex plane as possible, thus failing to meet the above second condition. Therefore, a problem arises in that the peak power of modulated signals cannot be made sufficiently low, thus making the transmission error rate high.

Next, as a third prior art, there is known a signal point arranging method, which is disclosed in published examined Japanese Patent Application No. 63-24342. Here, signal points located at corners distant from the coordinate axes of the complex plane are relocated close to the coordinate axes, thereby decreasing signal transmission power. With the third prior art, however, there is no diagrammatic regularity for relocating signal points on the complex plane. When the number of signal points is increased, they have to be relocated by trial and error, thus making the process troublesome.

As a fourth prior art, there is known a signal point arranging method, which is disclosed in published unexamined Japanese Patent Application No. 60-150359. Here, signal points are arranged on concentric circles disposed at equal intervals and in this case the signal points are determined so that the distance between them may have almost a predetermined value. In the case of this prior art, each signal point is arranged so that it may be brought as close as possible to the origin of the complex plane, thus complying with the above second condition. With the fourth prior art, however, signal points have to be positioned on each of the concentric circles by trial and error so that the distance between the signal points may be equal to or more than the predetermined value, thus making the logic for the signal point arrangement very difficult. In particular, it is necessary to measure and evaluate the distance between signal points each time a signal point is arranged. As can be seen, a problem with the fourth prior art is that the arrangement of signal points cannot be determined readily.

SUMMARY OF THE INVENTION

Considering the disadvantages of the arts described above, it is an object of the present invention to minimize the peak power of modulated signals, reduce transmission error rate and optimize S/N characteristics with the distance between signal points nearest to each other being held constant on a phase plane by a simple process without losing diagrammatic regularity.

That is, the present invention is premised on a signal point arranging method for use with a quadrature amplitude modulator/demodulator device in which a desired number of signal points is arranged on a rectangular plane. The method comprises a grid setting step, a concentric circle setting step and a signal point arranging step. First, in the grid setting step, a plurality of grid points spaced a unit distance apart are set symmetrically with respect to the rectangular coordinate axes of the rectangular plane. The rectangular plane may be, for example, a phase plane, and the grid may be, for example a square grid or a equilateral triangular grid.

Next, in the concentric circle setting step, a plurality of concentric circles, each having a radius equal to a distance between the coordinate origin and a grid point, are set with center at the coordinate origin of the rectangular plane.

Then, in the signal arranging step, a desired number of signal points is arranged on intersection points of the concentric circles and on grid points in increasing order of circles in radius beginning with the smallest. In this case, the signal points to be arranged on the outermost circle may be arranged at locations which are symmetrical with respect to the coordinate origin.

In such a signal arranging method as described above, by sequentially arranging signal points on the concentric circles with increasing radii beginning with the smallest, each of the signal points can be arranged as close to the coordinate origin as possible, thus enabling the peak power of modulated signals to be minimized. In addition, by arranging the signal points at intersections of the grid spaced a unit distance apart, the distance between signal points can be held constant. Thus, the S/N characteristic does not vary with the signal points and a low constant transmission error rate can be secured. As a result, a signal point arrangement is obtained which enables data transmission at minimum required power, reduces transmission error rate and optimizes the S/N characteristic.

BRIEF DESCRIPTION OF THE DRAWINGS

The foregoing aspects and the other features of the invention may be understood by those skilled in the art with reference to the following description of a preferred embodiment of the invention, taken together with the accompanying drawings in which.

DESCRIPTION OF THE PREFERRED EMBODIMENT

The principle of a signal point arranging method according to the present invention will be described first with reference to FIGS. 2A, 2B and 2C.

The subject of this invention is a signal point arranging method for arranging a desired number of signal points on a phase plane for use with a quadrature modulator/demodulator device.

Figure 1B:
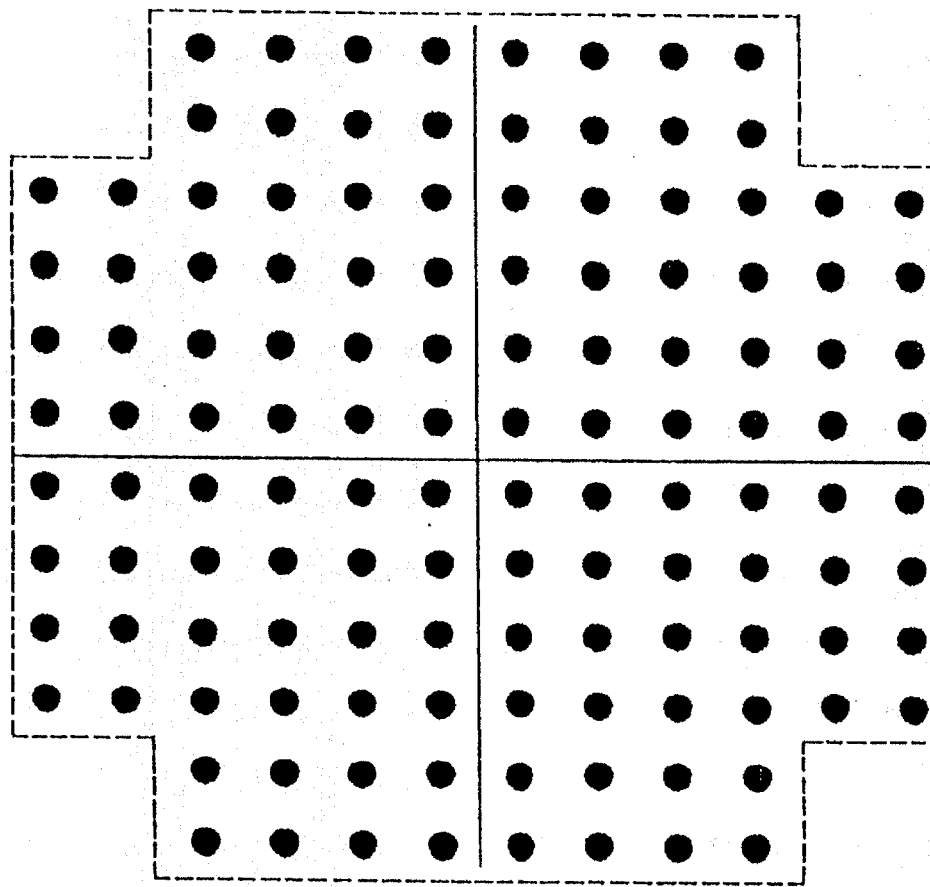
FIG. 1B is a diagram for explaining a second conventional signal arranging method.
Figure 1A:
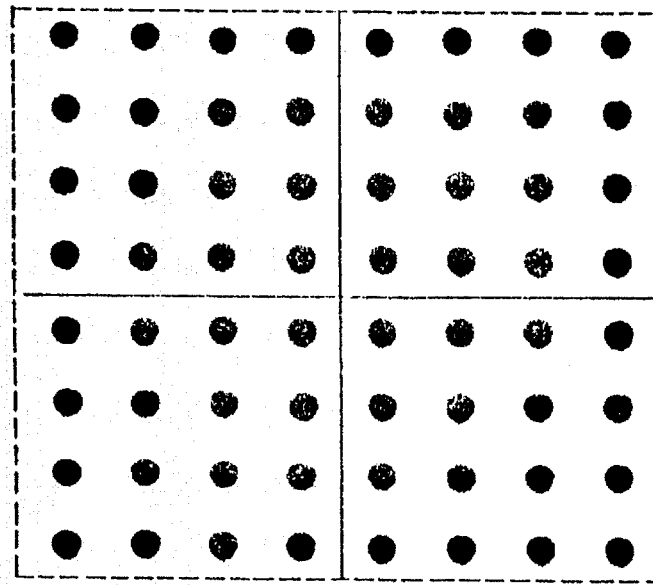
FIG. 1A is a diagram for explaining a first conventional signal arranging method.
Figure 2A:
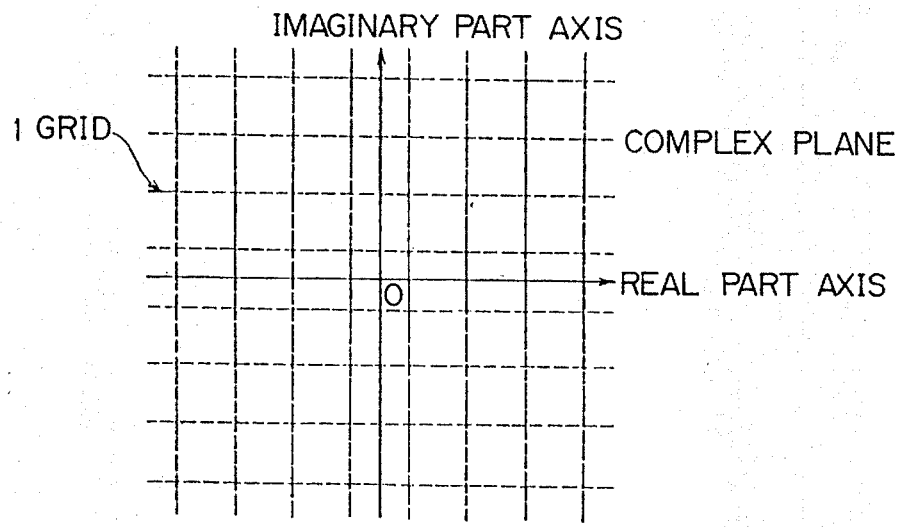
FIGS. 2A, 2B and 2C are diagrams for explaining the principle of the invention.

First, as shown in FIG. 2A, a grid 1 is set, which is symmetrical with respect to the rectangular coordinate axes of a phase plane, i.e., a complex plane, and which has intersection points disposed at regular intervals of a unit distance.

Figure 2B:
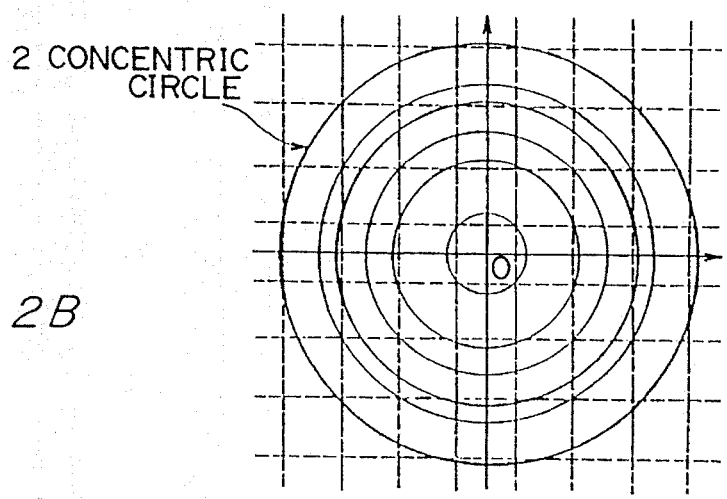
Figure 2C:
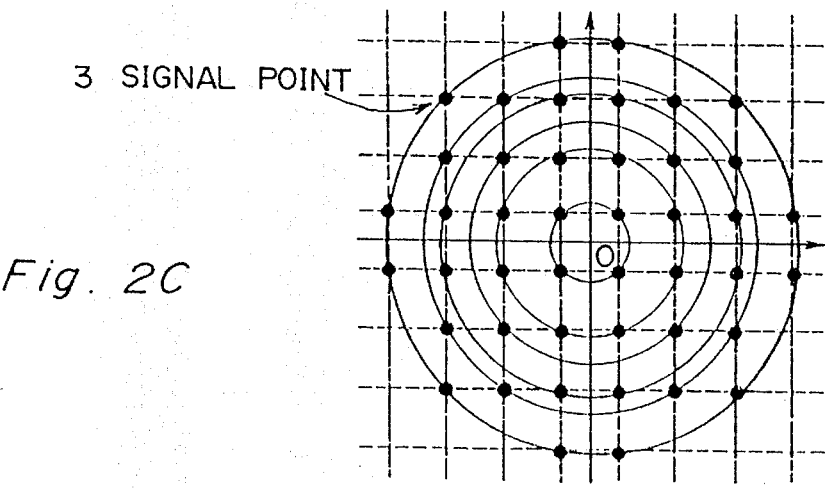

Next, as shown in FIG. 2B, concentric circles 2 are set with their centers at the origin O on the phase plane, each having a radius equal to the distance between origin O and corresponding intersection points of grid 1.

Then, a required number of signal points 3 are placed at the intersection points of grid 1 and each of circles 2 beginning with the smallest and continuing with circles of increasing radius.

According to this signal point arranging method, by placing signal points 3 on concentric circles 2 with their center at origin O, each of the signal points 3 can be placed as close to the origin O as possible, thereby minimizing the peak power of modulated signals.

Also, by placing signal points 3 at intersections of grid 1 which are spaced a unit distance apart, the distance between signal points can be held constant, so that the S/N ratio remains unchanged at each of signal points 3, thereby securing a low, constant transmission error rate.

As a result, a signal point arrangement is obtained, which enables data transmission with minimum required power transmission error rate to be reduced and S/N ratio to be maximized.

Figure 3:
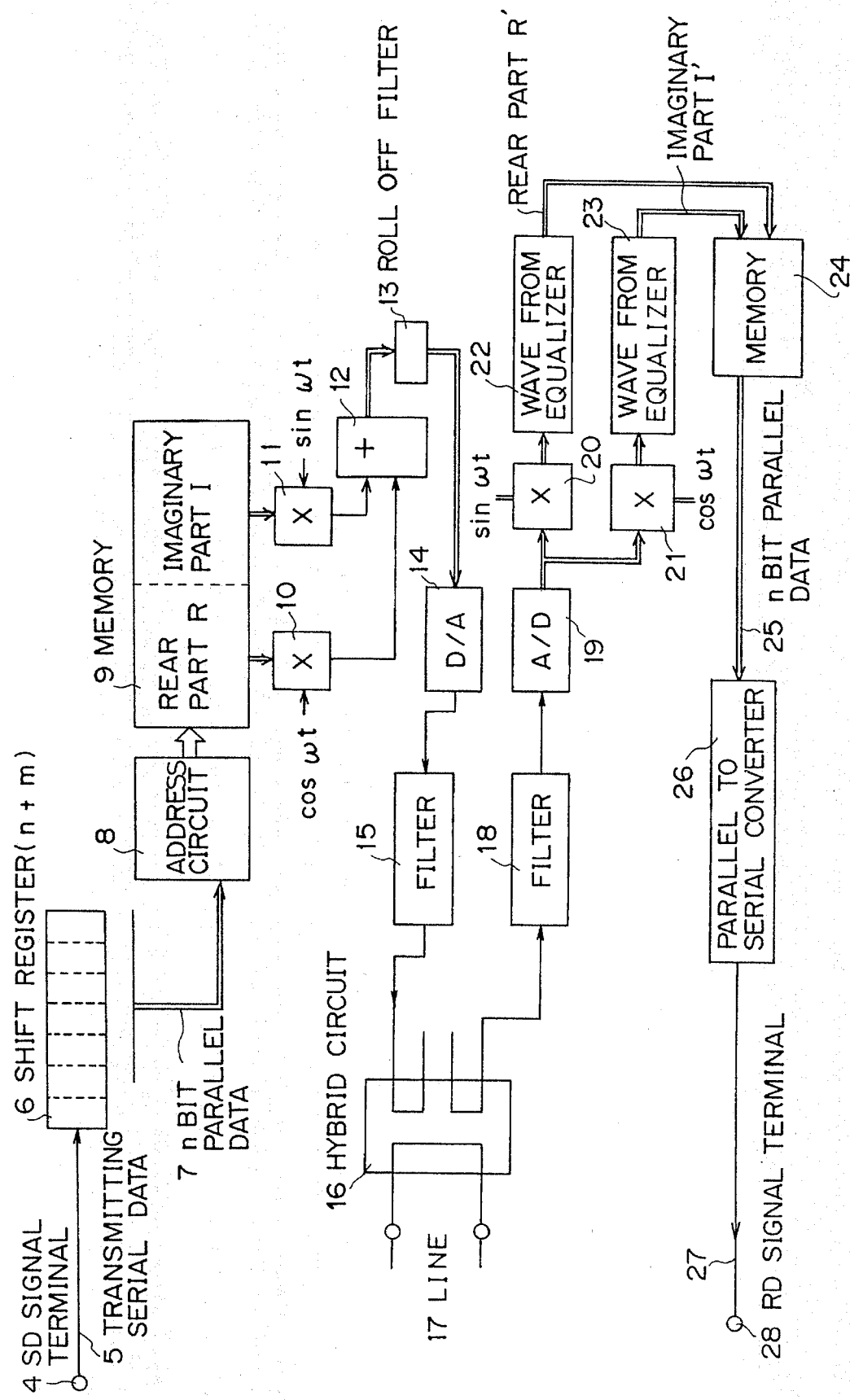
FIG. 3 is a schematic diagram of a modem according to an embodiment of the invention.

FIG. 3 illustrates an embodiment in which the above-mentioned signal-point arranging method is applied to a modem for a digital data circuit. On the transmission side of the modem, serial data to be transmitted is split into parts, each of n bits. The n-bit data is allotted to one of $2^n$ signal points on a phase plane as pattern data and is modulated for transmission. On the demodulation side of the modem, a decision is made as to which of $2^n$ signal points corresponds to the modulated data from the transmission side and then the received serial data of n bits for the corresponding signal point is demodulated.

First, the arrangement of the transmission side will be described.

Serial data 5 to be transmitted is supplied to an SD signal terminal 4 from a data sending terminal (not shown) and then serially entered into a shift register 6 having n+m stages from which n-bit parallel data is output.

Parallel data 7 is input to an address circuit 8, which in turn supplies address data corresponding to parallel data 7 to a memory 9. Memory 9 stores $2^n$ sets of a real part R and an imaginary part I which respectively correspond to real coordinate data and imaginary coordinate data of each of $2^n$ signal points on the phase plane. Each value of the real part R and the imaginary part I is determined on the basis of the signal point arranging method, to be described later.

Real part R and imaginary part I, read from a location of memory 9 specified by address circuit 8, are input to multipliers 10 and 11, respectively, so that they are multiplied by $\cos_\omega t$ and $\sin_\omega t$. Here $_\omega$ is angular frequency of a carrier and t is a time variable which increases with time. In this manner two carrier components $\cos_\omega t$ and $\sin_\omega t$ are amplitude modulated by the real part I and the imaginary part I, respectively.

Output signals of multipliers 10 and 11 are added together in an adder 12 and then applied to a roll-off filter to extract a baseband component. The baseband component is converted to an analog modulated signal by means of a digital to analog (D/A) converter 14 and a filter 15. The analog modulated signal is then applied to a hybrid transformer circuit 16 and sent out to a circuit 17 as a transmission signal.

The arrangement of the receiving side will now be described.

A modulated signal transmitted over circuit 17 is applied to a filter 18 via hybrid circuit 16 and then converted to a digital signal by an analog to digital (D/A) converter 19.

The received signal is multiplied by $\sin\omega_0 t$ and $\cos\omega_0 t$ in multipliers 20 and 21 for synchronous detection of the real and imaginary parts. The real and imaginary parts are applied to waveform equalizers 22 and 23, respectively, thus equalizing signal degradation suffered in the circuit. The real part R' and the imaginary part I' output from waveform equalizers 22 and 23 are supplied to a memory 24.

Memory 24 stores $2^n$ sets of n-bit parallel data corresponding to $2^n$ signal points on the phase plane. The corresponding relationship between the signal points and the parallel data is the same as that on the transmitting side. Memory 24 is arranged to output n-bit parallel data corresponding to a signal point near to a point on the phase plane which is defined by real part R' and imaginary part I' as data 25.

The n-bit parallel data 25 is entered into a parallel to serial converter 26 in no bit units. Parallel data 25, which is entered in n-bit unit, is converted to serial data by parallel to serial converter 26 and then output to a data receiving terminal (not shown) via an RD signal terminal 28 as serial received data 27.

An embodiment of the method of arranging $2^n$ signal points, each defined by a set comprising a real part R and an imaginary part I stored in memory 9 in the modem arranged as above on the phase plane, is described below. This embodiment is based on the signal arranging method described before with reference to FIGS. 2A, 2B and 2C. A description is made here of a signal arranging method where n=6, i.e., $2^n$=64, in FIG. 3, and grid 1 (refer to FIG. 2A) is a square grid.

Figure 4:
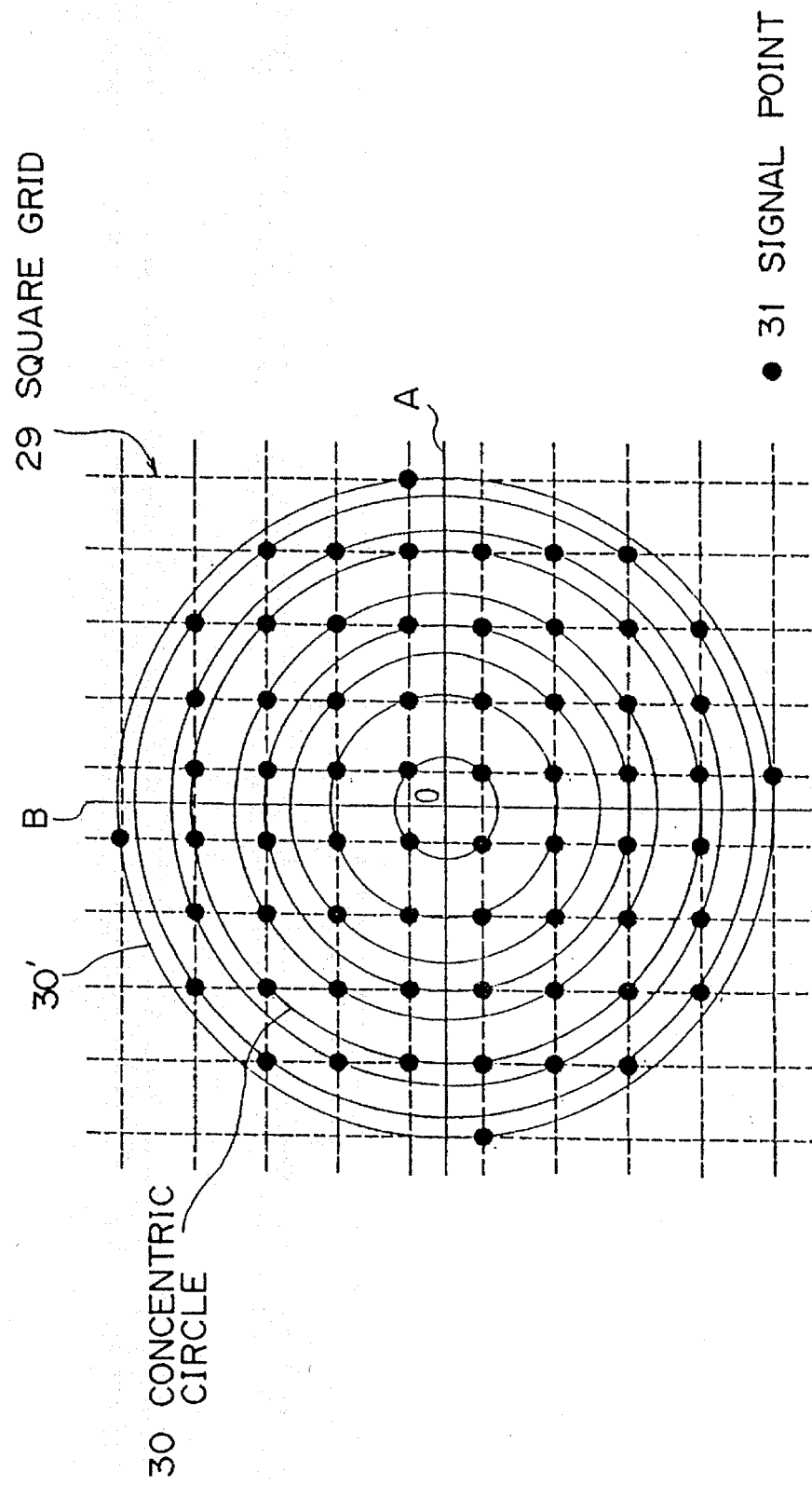
FIG. 4 is a diagram for explaining a signal arranging method of the invention.

In this embodiment of the signal point arranging method, signal points are arranged as show in FIG. 4 in accordance with the following procedure.

(1) A square grid 29 whose intersection points are spaced unit distance apart is provided so that the grid may be symmetrical with respect to the orthogonal coordinate axes A (real axis) and B (imaginary axis) of a phase plane.

(2) Concentric circles 30 are set each having a radius equal to the distance between origin O and an intersection of square grid 29.

(3) 64 signal points 31 are arranged on intersection points of square grid 29 and each of concentric circles 30, beginning with the smallest and continuing with circles of increasing radius.

(4) A set of each of signal point 31 comprising a real part (value on coordinate axis A) and an imaginary part (value on coordinate axis B) is stored in memory 9 of FIG. 3.

In the signal point arrangement of FIG. 4, the outermost circle 30' has eight locations on which signal points 31 are to be arranged. In fact, however, signal points 31 are arranged at four locations only. In terms of phase balance these four locations should be arranged point-symmetrically with respect to the coordinate origin O. That is, assuming that sets of real part R and imaginary part I for signal points 31 are selected randomly in memory 9 of FIG. 3 at the time of modulation, if signal points are provided at locations which are point symmetrical with respect to the coordinate origin O, distributions of frequency at which the four signal points are selected will become symmetrical with respect to each of real axis A and imaginary axis B. This will allow analog signal processing, such as filtering, to be performed easily.

In memory 9 of FIG. 3 are stored sets comprising a real part R and an imaginary part I, each corresponding to a separate one of the signal points arranged by the above-described method. Each of the sets is selected, as described above, by an address generated by address circuit 8 on the basis of n-bit parallel data 7. In this case, a correspondence between n-bit parallel data 7 having $2^n$ patterns and $2^n$ signal points may be established such that patterns having a high frequency of appearance are sequentially allotted to signal points 31 on concentric circles 30 of increasing radius. Since, as described above, the power of a modulated signal for each signal point is proportional to the square of the distance between the coordinate origin O and the signal point, the average transmission power of modulated signals can be lowered and transmission error rate can be reduced by the established correspondence described above.

In the present embodiment, as described above, a plurality of concentric circles 30 is drawn on a phase plane as shown in FIG. 4 and signal points 31 are sequentially arranged on concentric circles 30 of increasing radius, thereby enabling transmission at minimum power. As a result, the output voltage on the transmission side of the modem can be lowered, and each input signal accurately on the receiving side of the modem can be received and identified even if the received signal has a small dynamic range. This will allow the modem to be formed of inexpensive devices adapted to handle lower power, thereby reducing overall cost.

By setting square grid 29, by providing concentric circles 30 each having a radius equal to a distance between the coordinate origin O and an intersection of square grid 29 and by arranging signal points 31 on points of intersection between concentric circles 30 and square grid 29, it becomes possible to hold the distance between signal points constant, thereby permitting the S/N ratio to be made constant for each of the signal points.

In particular, by adopting square grid 29, a modulator/demodulator device can be constructed using a simple address circuit and memories, as in the above first and second prior arts based on the square arrangement.

Figure 5:
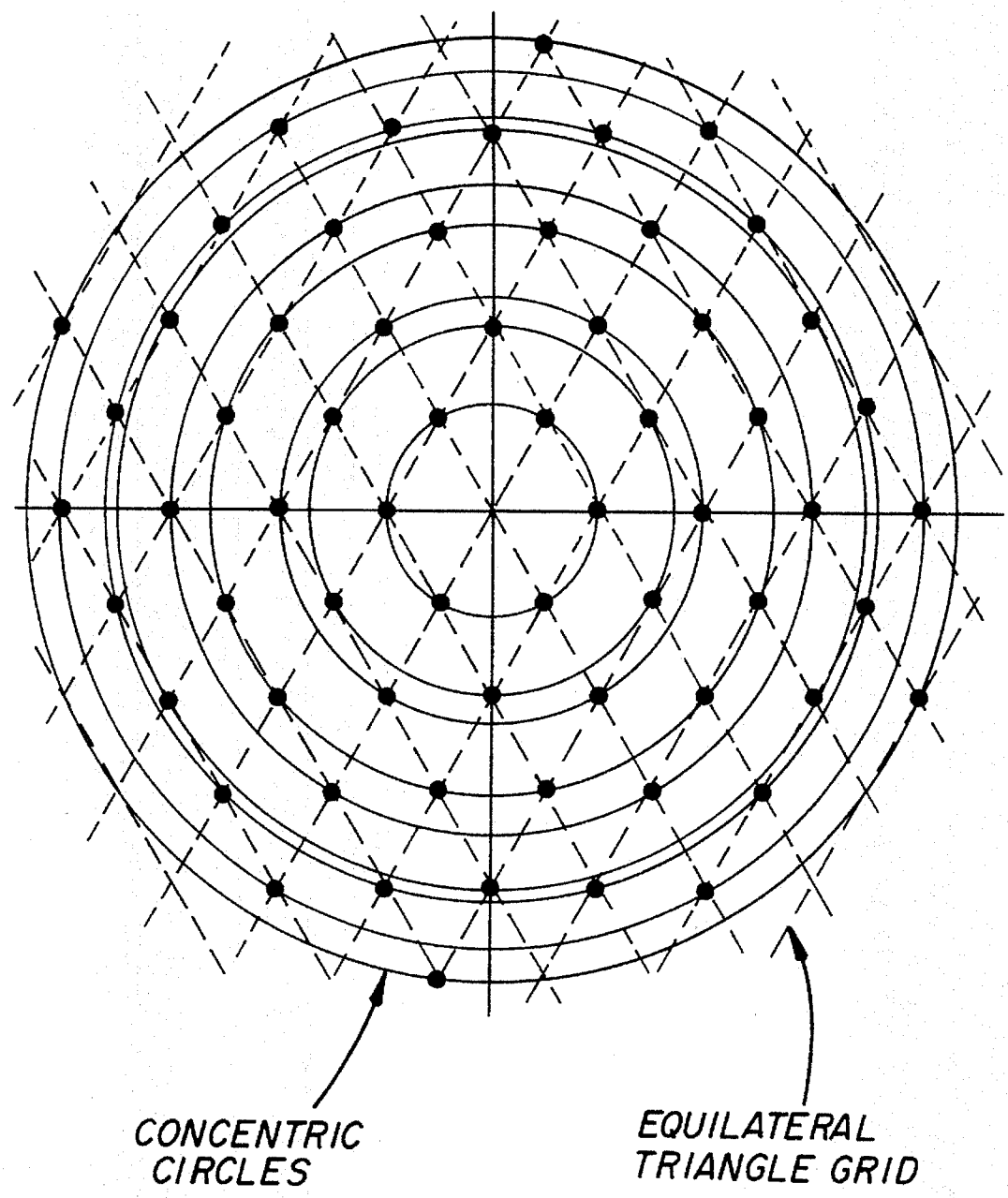
FIG. 5 is a diagram for explaining a signal arranging method using an equilateral triangular grid.

Square grid 29 is used in the above embodiment. Alternatively, an equilateral triangular grid may be used in order to make the distance between signal points constant (see FIG. 5). Where an equilateral triangular grid is used, the condition for the closest signal points can be satisfied, thereby optimizing the S/N characteristic. In this case, as is the case with FIG. 4, concentric circles each having a radius equal to a distance between the coordinate origin O and an intersection of the equilateral triangular grid are set and a required number of signal points are sequentially arranged on intersection points between the equilateral triangular grid and concentric circles of increasing radius.

To make the distance between signal points constant, other suitable grid structures than the above-mentioned square and equilateral triangular grids may be used.

Where the signal point arranging method according to the present invention is used, the S/N characteristic will be improved by about 0.1 dB when the number of signal points is 16 and by about 0.2 dB when the number of signal points is 256.

What is claimed is:

1. In a quadrature amplitude modulator/demodulator device in which a desired number of signal points are arranged on a rectangular plane, a method of arranging the signal points on the rectangular plane comprising the steps of:

setting a plurality of grid points symmetrical with respect to rectangular coordinate axes of the rectangular plane and arranged at intervals of a unit distance;

setting at least four or more concentric circles with each center thereof at a coordinate origin of the rectangular plane, each of said concentric circles having a radius equal to a distance between the coordinate origin and a corresponding grid point; and arranging a desired number of $2^n$ signal points on all points of intersection of said grid points and said concentric circles, beginning with the concentric circle smallest in radius, before continuing sequentially with concentric circles of increasing radius, where n is the number of bits of transmission data.

2. The method according to claim 1, in which said rectangular plane is a phase plane and said grid points form a square grid.

3. The method according to claim 1, in which said rectangular plane is a phase plane and said grid points form an equilateral triangular grid.

4. The method according to claim 1, in which, in said signal point arranging step, signal points to be arranged on an outermost circle are arranged at locations which are point symmetrical with respect to the coordinate origin of the rectangular plane.

5. A quadrature amplitude modulator device for quadrature amplitude modulating data for transmission, comprising:

modulation data outputting means for outputting, as modulation data, one set of $2^n$ sets of first and second coordinate values corresponding to $2^n$ signal points on a rectangular plane, said one set of first and second coordinate values corresponding to n bits of transmission data, said $2^n$ signal points arranged on all points of intersection of grid points and at least four concentric circles, beginning with the concentric circle smallest in diameter, before continuing sequentially with concentric circles, of increasing radius, said grid points are symmetrical with respect to rectangular axes of said rectangular plane and are arranged at intervals of unit distance, each concentric circle having a center at a coordinate origin of said rectangular plane and having a radius equal to a distance between the coordinate origin and a corresponding grid point; and amplitude modulating means for amplitude modulating two carrier components 90° apart in phase with the first and second coordinate values from said modulation data outputting means and for combining modulated carrier components for transmissions.

6. A quadrature amplitude demodulator device for demodulating a received modulated signal resulting from quadrature amplitude modulation, comprising:

detecting means for demodulating the modulated signal by use of two carrier components 90° apart in phase to obtain a first coordinate value and a second coordinate value on two rectangular coordinate axes of a rectangular plane; and demodulating means for outputting, as received data, n-bit pattern data corresponding to a signal point near to a point on said rectangular plane defined by the first and second coordinate values from said detecting means, said n-bit pattern data being one of $2^n$ sets of n-bit pattern data for predetermined $2^n$ signal points on said rectangular plane, said $2^n$ signal points arranged on all points of intersection of grid points and concentric circles, beginning with the concentric circle smallest in diameter, before continuing sequentially with concentric circles of increasing radius, said grid points are symmetrical with respect to rectangular axes of said rectangular plane and are arranged at intervals of unit distance, each concentric circle having a center at a coordinate origin of said rectangular plane and having a radius equal to a distance between the coordinate origin and a corresponding grid point.

7. A quadrature amplitude modulator/demodulator device for quadrature amplitude modulating transmission data for transmitting and for demodulating a received quadrature amplitude modulated signal comprising:

a quadrature amplitude modulator section having modulation data outputting means for outputting, as modulation data, one set of $2^n$ sets of first and second coordinate values corresponding to $2^n$ signal points on a rectangular plane, said one set of first and second coordinate values corresponding to n bits of the data to be transmitting, said $2^n$ signal points arranged on all points of intersection of grid points and at least four concentric circles beginning with the concentric circle smallest in diameter, before continuing sequentially with concentric circles of increasing radius, said grid points are symmetrical with respect to rectangular axes of said rectangular plane and are arranged at intervals of unit distance, each concentric circle having a center at a coordinate origin of said rectangular plane and having a radius equal to a distance between the coordinate origin and a corresponding grid point, and amplitude modulating means for amplitude modulating two carrier components 90° apart in phase with the first and second coordinate values from said modulation data outputting means and for combining modulated carrier components for transmission; and a quadrature amplitude demodulator section having detecting means for demodulating the modulated signal using said two carrier components 90° apart in phase to obtain said first coordinate value and said second coordinate value on rectangular coordinate axes of said rectangular plane, and demodulating means for outputting, as received data, n-bit pattern data corresponding to a signal point near to a point on said rectangular plane defined by the first and second coordinate values from said detecting means, said n-bit pattern data being one of $2^n$ sets of said n-bit pattern data for said $2^n$ signal points on said rectangular plane.

* * * * *